(12) United States Patent
Kightlinger et al.

(10) Patent No.: US 6,375,798 B1
(45) Date of Patent: Apr. 23, 2002

(54) DERIVATIZED MALTO-OLIGOSACCHARIDES, METHODS FOR TRASH SCAVENGING, AND PROCESS FOR PREPARING A PAPER WEB

(75) Inventors: Adrian P. Kightlinger, Muscatine, IA (US); Stuart W. Mabee, Medina, OH (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 09/587,545

(22) Filed: Jun. 5, 2000

(51) Int. Cl.[7] .......................... D21H 17/29; C08B 31/00
(52) U.S. Cl. ..................... 162/175; 162/164.6; 536/45
(58) Field of Search .......................... 162/158, 163, 162/164.1, 164.6, 168.1, 175, 176, 177, 183, 184, 185; 510/450, 454; 524/47, 56, 58; 525/54.24, 54.31; 536/45; 210/705, 723, 725, 731, 734, 735

(56) References Cited

U.S. PATENT DOCUMENTS

| | | | | |
|---|---|---|---|---|
| 4,154,744 A | * | 5/1979 | Hamada et al. | 549/483 |
| 5,334,287 A | * | 8/1994 | Hartmann et al. | 162/275 |
| 5,354,424 A | * | 10/1994 | Rha et al. | 162/135 |
| 5,851,300 A | * | 12/1998 | Linhart et al. | 127/32 |

OTHER PUBLICATIONS

WO 98/24972 Jaycock et al. PCT International Application, Jun. 11, 1998.*
WO 95/18157 Vihervaara et al. PCT International Application, Jul. 6, 1995.*
Reference Summary to Yalpani, "Supercritical Fluids: Puissant Media for the Modification of Polymers and Biopolymers," Polymer, vol. 34 (1993), pp. 1102–1105.*

* cited by examiner

Primary Examiner—Peter Chin
Assistant Examiner—Eric Hug
(74) Attorney, Agent, or Firm—Leydig Voit & Mayer, Ltd.

(57) ABSTRACT

Disclosed is a method for derivatizing a malto-oligosaccharide. The method includes the steps of providing the malto-oligosaccharide and derivatizing the malto-oligosaccharide in an aqueous medium with a cationic agent to form a derivatized malto-oligosaccharides. Malto-oligosaccharides having a high DS sufficient to render the derivatized product suitable for use as a trash scavenger are attainable in accordance with the present inventive method. Also disclosed are a method for trash scavenging, a process for preparing a paper web, in which anionic trash is scavenged prior to withdrawing a paper web from a pulp furnish; and a paper web prepared in accordance with the present inventive process.

6 Claims, 1 Drawing Sheet

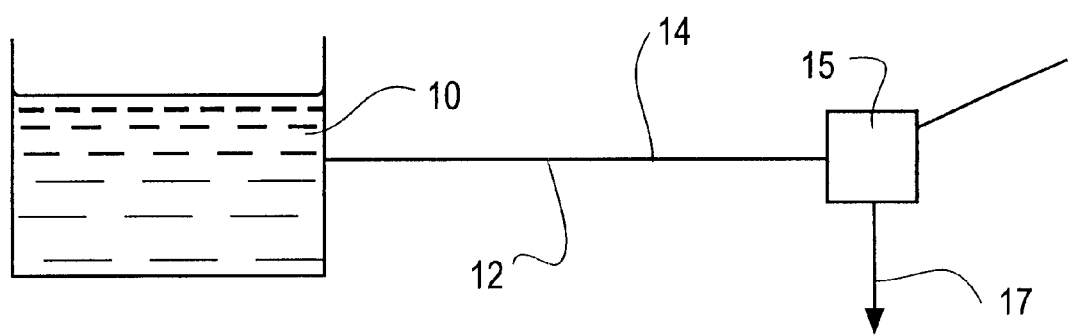

DERIVATIZED MALTO-OLIGOSACCHARIDES, METHODS FOR TRASH SCAVENGING, AND PROCESS FOR PREPARING A PAPER WEB

TECHNICAL FIELD OF THE INVENTION

The invention is in the field of starch derivatives, and more particularly, is in the field of derivatized malto-oligosaccharides. The derivatized malto-oligosaccharides of the invention find particular utility as trash scavengers in the pulp and paper industry.

BACKGROUND OF THE INVENTION

In papermaking furnishes, anionic trash, which includes such materials as lignins, hemicelluloses, and fatty acids, is common. This trash material interferes with the performance of other additives, which include cationic retention aids, starches, and sizing agents, and often causes a reduction in machine performance and in physical sheet properties. To reduce the amount of anionic trash in the furnish, the prior art has taught to add a coagulant (commonly known as a "trash scavenger") to the papermaking furnish at the wet end of the papermaking machine. The coagulant carries a cationic charge in solution, and tends to neutralize the an ionic trash material, keeping it from interfering with the performance of other process aids, and allowing it to be removed from the process with the fiber as the sheet is formed. Commonly used coagulants include alum, polyaluminum chloride (PAC), polyethylenimine, polyamines, and poly diallyldimethyl ammonium chloride (poly DADMAC).

Charged starches may be used as trash scavengers in connection with the treatment of pulp and paper process water. In many such applications, it is desired to derivatize starch or derivatives of starch (such as maltodextrins) to impart a charge to the starch backbone. Many methods for derivatizing starch and starch derivatives are known. For example, U.S. Pat. No. 5,795,397 (Shi et al., assignors to National Starch and Chemical Investment Holding Corporation, Wilmington, Del.) purports to disclose enzymatic treatment of starch derivatives to form modified starch derivatives. The modified starch derivatives are said to be useful as an ingredient in remoistenable adhesive compositions. The starch derivatives taught by this patent generally have a degree of substitution (DS) less than about 0.5, and thus generally are not suitable for use in applications where a higher DS starch is desired. Another document, WO095/18157 (Vihervaara et al., assignors to Raisio Chemicals Oy, Raisio, Finland), discloses starch derivatives that have a higher degree of substitution than those taught in U.S. Pat. No. 5,795,397. It has been found difficult, however, to reproduce the teachings of this patent; moreover, there remains room for improvement of the coagulants described therein.

SUMMARY OF THE INVENTION

It has now been found that malto-oligosaccharides can be derivatized in an aqueous medium with cationic derivatizing agents to form derivatized malto-oligosaccharides. It has further been disclosed that such derivatized malto-oligosaccharides are useful as trash scavengers in the pulp and paper industries.

In accordance with one embodiment of the invention, a method for derivatizing malto-oligosaccharides is provided. The invention contemplates a method wherein a malto-oligosaccharide is derivatized in aqueous medium with a cationic agent to form a derivatized malto-oligosaccharide having a DS greater than about 0.5, or, when the derivatized malto-oligosaccharide is used as a coagulant, derivatized to any, DS sufficient to render the derivatized malto-oligosaccharide suitable for use as a trash scavenger. The invention further encompasses a method for trash scavenging. The trash scavenging method includes the steps of providing a liquid that contains anionic materials, and adding to the liquid an amount of the derivatized malto-oligosaccharide effective to neutralize at least a portion of the anionic materials. The method preferably is utilized in connection with the manufacture of paper. The invention also encompasses a process for preparing a paper web, as well as a paper web prepared in accordance with the inventive process. In accordance with these embodiments, a furnish that contains anionic materials is provided. The anionic material is neutralized using a cationically derivatized malto-oligosaccharide.

BRIEF DESCRIPTION OF THE DRAWING

The FIGURE is a representational illustration of a process for preparing a paper web.

DESCRIPTION OF THE PREFERRED EMBODIMENTS

In accordance with one embodiment of the invention, a malto-oligosaccharide is derivatized. The malto-oligosaccharide that is to be derivatized may be prepared or purchased commercially or may be prepared in accordance with any suitable method. By "malto-oligosaccharide" is contemplated any species that comprises two or more saccharide (D-glucose) units linked predominantly via $\alpha1\rightarrow4$ glucosidic linkages, and including maltodextrins and syrup solids. Preferably, the malto-oligosaccharide is a maltodextrin, i.e., a saccharide polymer which consists of D-glucose units linked primarily by $\alpha1\rightarrow4$ glucosidic bonds and which has a dextrose equivalent (DE) of less than 20.

In accordance with preferred embodiments of the invention, the maltodextrin is selected from among the MALTRIN® series of malto-oligosaccharides, sold by Grain Processing Corporation of Muscatine, Iowa. MALTRIN® maltodextrins that are suitable for use in conjunction with the invention include, for example, MALTRIN® M180, MALTRIN® M150, MALTRIN® M100, MALTRIN® M050, and MALTRIN® M040. These malto-oligosaccharides have the approximate DP profiles given in the following table:

| DP profile | Typical DP profile (% dry solids basis) | | | | | | | | | |
|---|---|---|---|---|---|---|---|---|---|---|
| | M180 | | M150 | | M100 | | M050 | | M040 | |
| DP >8 | 46.6 | ±4% | 54.7 | ±4% | 67.8 | ±4% | 90.6 | ±4% | 88.5 | ±4% |
| DP 8 | 3.9 | ±2% | 4.8 | ±1.5% | 4.5 | ±1.5% | 1.5 | ±1% | 2.0 | ±1% |
| DP 7 | 9.5 | ±2% | 9.1 | ±1.5% | 7.0 | ±1.5% | 1.5 | ±1% | 2.4 | ±1% |
| DP 6 | 11.4 | ±2% | 8.4 | ±1.5% | 6.1 | ±1.5% | 1.4 | ±1% | 1.8 | ±1% |
| DP 5 | 5.9 | ±2% | 4.7 | ±1.5% | 3.3 | ±1.5% | 1.3 | ±1% | 1.3 | ±1% |
| DP 4 | 6.4 | ±2% | 5.5 | ±1.5% | 3.7 | ±1.5% | 1.1 | ±1% | 1.4 | ±1% |
| DP 3 | 8.3 | ±2% | 6.7 | ±1.5% | 4.2 | ±1.5% | 1.0 | ±1% | 1.4 | ±1% |
| DP 2 | 6.2 | ±2% | 4.8 | ±1% | 2.5 | ±1% | 0.8* | ±1% | 0.9* | ±1% |
| DP 1 | 1.8 | ±1.5% | 1.3 | ±1% | 0.7* | ±1% | 0.8* | ±1% | 0.3* | ±1% |

*MINIMUM VALUE = 0%

Other maltodextrins suitable for use in conjunction with the invention include MALTRIN® M440, MALTRIN® M510, MALTRIN® 550, MALTRIN® M580, and MALTRIN® M700. Syrup solids or other malto-oligosaccharides as may be known or found to be suitable are deemed suitable for use in connection with the invention. Examples of commercially available syrup solids that are suitable for use in conjunction with the invention include MALTRIN® M200 and MALTRIN® M250, also sold by Grain Processing Corporation of Muscatine, Iowa.

In accordance with this embodiment of the invention, the malto-oligosaccharide is derivatized with a cationic derivatizing agent. The cationic derivatizing agent may be any agent suitable for imparting a cationic charge to the malto-oligosaccharide backbone. The agent may be selected from among known cationic derivatizing agents, such as 3-chloro-2-hydroxypropylene trimethyl ammonium chloride or 2,3-epoxy propylene trimethyl ammonium chloride (the latter being sold by DeGussa under the designation QUAB 151), or may be any other cationic derivatizing agent as may be known or found suitable for use in conjunction with the invention. Preferably, the derivatizing agent is QUAB 151. Another suitable cationic derivatizing agent is chlorohydroxypropyl trimethyl ammonium chloride, sold under the name QUAT 188 by Dow Chemical.

The malto-oligosaccharide is derivatized with the cationic derivatizing agent under any suitable reaction conditions, most preferably in an aqueous medium. The malto-oligosaccharide is preferably provided in the aqueous medium in an amount ranging from about 40% to about 70% by weight. The cationic derivatizing agent preferably is added in amount ranging from about 25 to about 150% by weight, more preferably, from about 50 to about 75% by weight, of the malto-oligosaccharide in the solution. Preferably, the initial reaction temperature, ranges from about 35° to about 100° C. The initial pH of the aqueous reaction solution is preferably basic and preferably ranges from about pH 10 to about pH 13, although it is contemplated that either the temperature or the pH or both may change as the reaction proceeds. Other reaction conditions as may be found suitable also or alternatively may be used in conjunction with the invention. For example, the temperature and/or pH may be controlled, if desired, such that they remain at or near the initial reaction temperature and/or pH; other solvents may be chosen; and more generally, other reaction conditions may be chosen as may be found suitable.

The product of the reaction between the malto-oligosaccharide and the cationic derivatizing agent will be a liquid mixture that contains a malto-oligosaccharide that has been derivatized with the cationic derivatizing agent. The reaction preferably is allowed to proceed to provide a malto-oligosaccharide that is substituted to a DS of at least about 0.5, and more preferably, to a DS of at least about 0.7.

The reaction time required to attain such degree of substitution typically is up to about 5 hours, and more typically is about 3 to about 4 hours. The solids content of the reaction solution may range from about 50% to about 70% in the preferred embodiment.

If desired, the derivatized malto-oligosaccharide may be separated from the reaction solution and optionally isolated, or the reaction solution may be used "as is" in a desired application. Generally, when the derivatized malto-oligosaccharide is intended for use as a trash scavenger, no isolation is necessary, and the solution may be used "as is."

The invention also encompasses a method for trash scavenging. The method includes the steps of providing a liquid containing anionic materials, such as municipal or industrial waste water, or a pulp furnish, and adding to the liquid the derivatized malto-oligosaccharide in an amount effective to neutralize at least a portion of the anionic materials.

When the malto-oligosaccharide is added to a papermaking furnish as a trash scavenger, the malto-oligosaccharide may be used in connection with a process for preparing a paper web. The paper web may be a handsheet or a finished sheet of paper. The FIGURE illustrates in representational form a papermaking process. A fibrous pulp slurry 10 containing fibers (typically wood pulp fibers) and anionic trash comprising at least one anionic trash species such as lignin, hemicellulose, or the like, is provided. To the slurry is added the cationic malto-oligosaccharide in part or full at steps 12 and/or 14 (these steps typically occur at the suction side of the blend chest pump (not shown) and the suction side of the primary fan pump (not shown)). In practice, the addition point will vary depending on the paper making system in which the coagulant is used. The cationic malto-oligosaccharide will neutralize the anionic trash upon addition to the fiber slurry. At the headbox 15 of the paper making machine, a paper web comprising pulp fibers and retained compounds of the furnish is formed from the furnish, leaving whitewater which is removed at step 17. The neutralized anionic trash will form aggregates with the malto-oligosaccharide, and the aggregates thus formed will be removed from the system with the paper web. In subsequent steps (not shown), the web is dried, optionally rolled, and cut into sheets.

The derivatized malto-oligosaccharide may be used in any amount and added at any step in the papermaking process deemed suitable by the papermaker. Generally, the malto-oligosaccharide should be added in an amount sufficient to neutralize the anionic trash materials in the furnish, without "over-charging" the furnish (i.e., without adding more cationic charge to the furnish than necessary). It is contemplated that, in typical use, the malto-oligosaccharide will be added in an amount ranging from about 0.10 to about 20 lbs./ton, more preferably, about 1 to about 10 lbs./ton of the papermaking furnish. In all other respects, the papermaking process may be conventional or otherwise as may be found suitable.

The derivatized malto-oligosaccharides prepared in accordance with the invention are not limited in use to the foregoing application. For example, the derivatized malto-oligosaccharides exhibit excellent adhesion to polyester, and thus are useful in connection with polyester warp sizing. Other applications as may be known in the art or as may be discovered are also deemed to be contemplated by the present invention.

The following Examples are provided to illustrate the present invention, but should not be construed as limiting in scope.

EXAMPLE 1

Preparation of Derivatized Malto-Oligosaccharide

This Example illustrates the preparation of a derivatized malto-oligosaccharide.

Two hundred grams (dry solids basis) of MALTRIN® M100 was dissolved in 280 ml of water. Sodium hydroxide, 24.0 g of a 50% solution (0.24 eq.), was added to the reaction vessel over a period of 10 minutes. QUAB 151, (2,3-Epoxypropyl-N,N,N-trimethylammonium chloride, Degussa Corp.) 214.1 g of a 70% solution (0.80 eq.), was added to the reaction, and the temperature was controlled to maintain a temperature of 60° C. for three hours. After three hours, the reaction mixture was a black, viscous solution. The pH of the solution was adjusted to 6.0 with HCl. The material was then freeze dried to yield 361 g of a dark orange-brown amorphous solid. The unpurified, recovered yield after moisture and ash correction was 92%. MALDI molecular weight analysis indicated a maximum molecular weight of about 1,330 units. Nitrogen combustion analysis showed that the crude material contained 3.73% nitrogen. A portion of the sample was ultrafiltered through a 3,000 MWCO membrane (Millipore Corp., Bedford Mass.) to yield a retentate that had a nitrogen value of 3.07%. Based on these values, a reaction efficiency of 82% was determined. This reaction efficiency correlates to a degree of substitution (DS) of 0.66.

Calculation: DS=(reaction efficiency) (moles of QUAB 151)/(moles of anhydroglucose units).

EXAMPLES 2–10

Preparation of

Derivatized Malto-Oligosaccharides

For each of the following Examples, a derivatized malto-oligosaccharide was prepared.

To a resin kettle equipped with an agitator, thermocouple, heater, and condenser was added 420 g H₂O, and 450 g (643 g as is) QUAB 151. With the heat control set at 35° C., a malto-oligosaccharide (of the type and in the amount shown in the following table) was added (each malto-oligosaccharide was added in a separate Example). When the temperature reached 35° C., 72 g as is 50% NaOH solution was added. Heating was continued to 60° C., at which temperature a three-hour hold was applied.

The derivatization reaction was exothermic, and the reaction temperature reached approximately 90–100° C. in each case. At the end of the three-hour hold period, the heater was turned off, and the mixture was allowed to cool. When the mixture reached 46° C., the pH of the solution was adjusted to pH 6.0 with concentrated HCl. This procedure was repeated for the following Examples:

| Examples | Malto-dextrin | Malto-dextrin Amount | QUAB 151% on Maltrin | % Solids |
|---|---|---|---|---|
| 2 | Maltrin ® M040 | 560 g | 75 | 54.9 |
| 3 | Maltrin ® M040 | 560 g | 75 | 58.4 |
| 4 | Maltrin ® M100 | 560 g | 75 | 53.9 |
| 5 | Maltrin ® M100 | 560 g | 75 | 61.2 |
| 6 | Maltrin ® M150 | 560 g | 75 | 54.8 |
| 7 | Maltrin ® 150 | 560 g | 75 | 63.0 |
| 8 | Maltrin ® M180 | 560 g | 75 | 54.2 |
| 9 | Maltrin ® M180 | 560 g | 75 | 62.1 |
| 10 | Maltrin ® M180 | 420 g | 100 | 60.5 |

The DS of the malto-oligosaccharides of each Example was in excess of 0.56.

Evaluation

The derivatized malto-oligosaccharides prepared in accordance with Examples 2–10 were evaluated to determine their suitability for use as trash scavengers in a papermaking process.

A commercial papermaking plant was found to use 3.8 lbs. conventional coagulant/ton furnish in normal operation (the coagulant used was NALCO 7607, a polyamine coagulant). Based on this amount, the charge of each coagulant prepared in accordance with Examples 2–10 was determined via colloid titration, and the amount of malto-oligosaccharide coagulant needed to provide a charge equivalent to the 3.8 lbs./ton amount of conventional coagulant was determined.

The following results were obtained:

| Coagulant | Lbs./Ton |
|---|---|
| Nalco 7607 | 3.8 |
| Example 2 | 6.1 |
| Example 3 | 5.7 |
| Example 4 | 6.2 |
| Example 5 | 5.5 |
| Example 6 | 6.1 |
| Example 7 | 5.3 |
| Example 8 | 6.2 |
| Example 9 | 5.4 |
| Example 10 | 4.1 |

Each additional level is on a wet weight basis. The difference in the addition level for the malto-oligosaccharides of Examples 2–10 resulted from the variance in percent solids and quantity of quaternary ammonium present on the malto-oligosaccharide backbone.

The ability of each coagulant to influence dynamic retention properties was analyzed. To determine retention properties, a Britt Jar apparatus (Paper Research Materials, Inc., Syracuse, N.Y.) was used. The jar was equipped with a 200-mesh screen. To simulate conditions in a commercial papermaking plant, a 500 ml charge of furnish composed of whitewater and thick stock was obtained from the plant and added to the Britt Jar for processing. The following ingredients were added in sequence to the charge of furnish in the Britt jar.

| Time | Action |
| --- | --- |
| 0 sec | 500 ml charge to jar |
| 10 sec | First coagulant addition (60%) |
| 20 sec | Starch addition (30 lbs./ton) |
| 30 sec | Second coagulant addition (40%) |
| 40 sec | Retention aid addition (1.6 lbs./ton) |
| 50 sec | Colloidal silica addition (0.5 lbs./ton) |
| 60 sec | Collect sample |

As a control, retention values were collected without the use of any coagulant at the beginning and end of the testing procedures. For comparison, polyaluminum chloride and NALCO 7607 coagulants also were evaluated.

Following each sequence, a 30 mL aliquot was collected from the Britt Jar and discarded to ensure the collection of an untainted sample for testing. Then, a 100 mL sample was collected, filtered and ashed, and total filler and fiber retention were calculated in accordance with standard techniques. The testing was conducted over two days. The following results were obtained:

| DAY ONE | | |
| --- | --- | --- |
| Coagulant | Retention | Average |
| None | Total | 69.94 |
| | Filler | 57.19 |
| | Fiber | 76.51 |
| PAC | Total | 62.88 |
| | Filler | 56.29 |
| | Fiber | 72.06 |
| 7607 | Total | 65.40 |
| | Filler | 51.41 |
| | Fiber | 72.61 |
| Example 2 | Total | 64.35 |
| | Filler | 53.71 |
| | Fiber | 69.82 |
| Example 3 | Total | 68.01 |
| | Filler | 57.51 |
| | Fiber | 73.42 |
| Example 4 | Total | 68.83 |
| | Filler | 61.09 |
| | Fiber | 72.81 |
| Example 6 | Total | 70.95 |
| | Filler | 60.40 |
| | Fiber | 76.39 |

| DAY TWO | | |
| --- | --- | --- |
| Coagulant | Retention | Average |
| Example 5 | Total | 77.65 |
| | Filler | 71.71 |
| | Fiber | 80.71 |
| Example 7 | Total | 74.44 |
| | Filler | 61.17 |
| | Fiber | 81.27 |
| Example 8 | Total | 72.16 |
| | Filler | 67.57 |
| | Fiber | 74.53 |
| Example 9 | Total | 77.38 |
| | Filler | 68.83 |
| | Fiber | 81.79 |
| Example 10 | Total | 79.74 |
| | Filler | 74.86 |
| | Fiber | 82.26 |
| None | Total | 78.83 |
| | Filler | 74.81 |
| | Fiber | 80.90 |

Each value is the average of two data points.

As is evident from the control ("bookend") samples taken at the beginning and at the end of the testing procedures, the retention values increased considerably during the course of the testing. This was believed to be due to a change in the temperature and/or fiber content of the furnish, as is typical in retention investigations. These bookend results may be taken into account when evaluating retention properties.

Even considering the changes in the furnish which occurred with time, it is evident that the cationic maltodextrins provided similar or improved retention performance with respect to that provided by polyaluminum chloride or the NALCO 7607 coagulants. Examples 5 (derivatized MALTRIN® M100) and 10 (derivatized MALTRIN® M180) provide the best overall retention performance of all coagulants tested.

Handsheets were prepared from furnish treated with the coagulant of Example 3, with NALCO 7607, and with polyaluminum chloride. As a control, handsheets were prepared without the use of a coagulant. The handsheets were constructed by repeating the Britt jar sequence given above, using enough furnish to construct a handsheet which would contain a target basis weight of 40 lb./3,000 ft$^2$. After the change of furnish was treated in the Britt Jar, the furnish was transferred to a handsheet mold and a handsheet was formed. Each sheet was pressed twice at 5 minutes and 2 minutes, dried on a drum dryer at 100° F. for approximately 20 minutes, and allowed to cure overnight in a constant humidity room prior to testing. After this time had elapsed, the handsheets were evaluated for basis weight, mullen strength, tensile strength, Scott bond strength, caliper, brightness (GE scale), porosity, and ash content. Tests were performed using conventional testing procedures (the porosity was tested using a Gurley Densimeter). The following results were obtained:

Handsheet Properties

|  | Control | Nalco 7607 | PAC | Example 3 |
|---|---|---|---|---|
| BW | 2.37 | 2.41 | 2.42 | 2.43 |
| Mullen | 49.6 | 49.8 | 48.2 | 51.3 |
| Tensile | 23 | 23.6 | 25.3 | 24.3 |
| Scott Bond | 200 | 220 | 221 | 221 |
| Caliper | 6.03 | 5.62 | 6.08 | 5.94 |
| Brightness | 75.42 | 73 | 68.87 | 74.42 |
| Porosity | 127 | 143 | 113 | 147 |
| Ash | 10.1 | 9.73 | 9.91 | 9.94 |

All of the coagulants provided a significant increase in Scott Bond strength compared to the control. In addition, use of the cationic maltodextrin may promote increased mullen strength, as well as increased porosity, signifying a less porous sheet. Increased porosity can correlate to a reduction in pinholes, thereby providing a benefit to copy paper producers, and also can correlate to improved printability.

The retention property evaluation was repeated for the derivatized malto-oligosaccharides of Examples 2, 4, and 8, using a "cleaner" furnish composed of fresh water, whitewater, and thick stock. The addition levels of the coagulant were adjusted to suit the charge demand of the furnish (the adjustment was a decrease of 63%). The starch, retention aid, and colloidal silica addition levels also were reduced. The following results were obtained:

| Coagulant | Retention | Average |
|---|---|---|
| Control | Total | 46.28 |
|  | Filler | 32.29 |
|  | Fiber | 55.73 |
| PAC | Total | 39.49 |
|  | Filler | 43.51 |
|  | Fiber | 36.78 |
| 7607 | Total | 42.44 |
|  | Filler | 40.62 |
|  | Fiber | 43.63 |
| Example 2 | Total | 42.95 |
|  | Filler | 42.19 |
|  | Fiber | 43.46 |
| Example 4 | Total | 41.61 |
|  | Filler | 31.98 |
|  | Fiber | 48.11 |
| Example 8 | Total | 41.13 |
|  | Filler | 34.91 |

| Coagulant | Retention | Average |
|---|---|---|
|  | Fiber | 45.32 |
| Control | Total | 35.94 |
|  | Filler | 34.24 |
|  | Fiber | 37.09 |

Each value is the average of five data points.

The retention values of the control samples collected at the beginning and end of the testing procedures again indicated a change in the fabricated furnish over time. Taking this change into account, the experiment malto-oligosaccharides performed better than both the polyaluminium chloride and Nalco 7607 coagulants.

Handsheets were prepared from the furnishes and tested for basis weight, mullen, tensile strength, Scott Bond, caliper, brightness, porosity, and ash. The following results were obtained:

|  | Blank | Nalco 7607 | PAC | Example 2 | Example 4 | Example 8 |
|---|---|---|---|---|---|---|
| BW | 1.86 | 1.88 | 1.96 | 1.90 | 1.89 | 1.9 |
| Mullen | 38.8 | 39.2 | 39.8 | 39.00 | 40.2 | 40.2 |
| Tensile | 17.4 | 17.8 | 17.3 | 19.40 | 18.1 | 18.8 |
| Scott Bond | 131 | 153 | 152 | 153.00 | 155 | 164 |
| Caliper | 5.01 | 5.05 | 5.06 | 4.89 | 4.9 | 4.94 |
| Brightness | 75.75 | 76.54 | 76.8 | 76.80 | 77.9 | 78.31 |
| Forosity | 68.04 | 108 | 111 | 132 | 117 | 110 |
| Ash | 6.8 | 6.95 | 6.83 | 6.99 | 6.85 | 6.28 |

Each value is the average of five data points.

In this set of testing procedures, the experimental malto-oligosaccharides provided superior strength with respect to the commercially available coagulants.

EXAMPLE 11

This Example comparatively evaluates two cationic malto-oligosaccharides against a commercial trash scavenger with a retention aid system.

Malto-oligosaccharides were cationically derivatized with QUAB 151 and with QUAT 188. In derivatizing with QUAT 188, to a resin kettle equipped with an agitator, thermocouple, heater and condenser were added 263 g water, 373.6 g (575 g as is) QUAT 188 and MALTRIN® M040 (400 g dry solids basis, 426 as is). While the mixture was being heated to 75° C., a 50% sodium hydroxide solution (208 g) was added. The reaction was allowed to stir for three hours at or above 75° C. During the first thirty minutes of this three-hour hold period, the exothermic reaction peaked at 99° C. After three hours at or above 75° C., the mixture was air cooled to 30° C. and neutralized to pH 5.2 by the addition of 30 mL of concentrated hydrochloric acid.

To evaluate the derivatized malto-oligosaccharides, a pulp furnish was produced by blending 75% Kraft hardwood pulp with 25% Kraft softwood. The furnish was refined to a Canadian Standard Freeness of 300 mL using a Valley Beater. The furnish consistency was 0.5072%. In separate experiments, each of the cationically derivatized malto-oligosaccharides was added to the furnish in a Britt jar, and the retention properties of the furnish drawn through the Britt jar wire were evaluated. The Britt jar addition sequence as as follows:

| TIME (SECONDS) | ACTION |
|---|---|
| 0 | 500 ml charge of furnish |
| 20 | Trash scavenger |
| 40 | 0.5 lb/tn PERCOL 182 (a polyamine retention aid sold by Allied Colloid) |
| 50 | 2.3 lb/tn POLYFLEX (a micropolymer retention aid sold by Cytec) |
| 60 | Sample collected |

As a control, Nalco 7607 was also evaluated in the same manner. The addition level of the trash scavenger in each experiment was as follows:

| | |
|---|---|
| QUAT-188 - derivatized malto-oligosaccharide | 2.2 lb./ton (wet weight addition) |
| QUAB-151 - derivatized malto-oligosaccharide | 2.2 lb./ton (wet weight addition) |
| NALCO 7607 | 1.4 lb./ton (wet weight addition) |

The following results were obtained:

| TRASH SCAVENGER | TOTAL RETENTION* |
|---|---|
| QUAT-188 - derivatized malto-oligosaccharide | 67.77% |
| QUAB-151 - derivatized malto-oligosaccharide | 68.07% |
| NALCO-7607 | 67.56% |

*Avg. of two tests

These results indicate that each of the cationically derivatized malto-oligosaccharides provided retention performance that was similar to or better than the control, NALCO 7607. Moreover, QUAT-188 was found to be suitable as a derivatizing agent for use in connection with a malto-oligosaccharide intended for use as a trash scavenger.

Thus, the invention provides a method for preparing a derivatized malto-oligosaccharide, as well as a coagulant for a papermaking furnish, a process for preparing a paper web, and a paper web.

While particular embodiments of the invention have been shown, it will be understood that the invention is not limited thereto since modifications may be made by those skilled in the art, particularly in light of the foregoing teachings. For example, it is contemplated that in some applications, the malto-oligosaccharide may be derivatized with an anionic derivatizing agent. An anionic derivatized maltodextrin could be utilized in systems containing excessive quantities of cationic components including recirculated retention aids, starches, alum, or the like. By neutralizing these excess materials, improvements would be expected in retention, drainage, formation, and other physical sheet properties and machine performance. It is, therefore, contemplated by the appended claims to cover any such modifications as incorporate those features that constitute the essential features of these improvements within the true spirit and scope of the invention. All references cited herein are hereby incorporated by reference.

What is claimed is:

1. A method for scavenging anionic trash, comprising the steps of:

providing a liquid containing flocculable materials;

adding to said liquid an amount effective to neutralize at least a portion of said materials of a derivatized malto-oligosaccharide prepared by a method comprising:

providing a malto-oligosaccharide;

derivatizing said malto-oligosaccharide with a cationic derivatizing agent to form a derivatized malto-oligosaccharide, said malto-oligosaccharide having a DS sufficient to render said derivatized malto-oligosaccharide suitable for use as a trash scavenger.

2. A method according to claim 1, wherein said liquid is a papermaking furnish.

3. A process for preparing a paper web, comprising the steps of:

providing a papermaking furnish, said papermaking furnish containing fibrous material and anionic trash comprising at least one anionic trash species;

adding to said papermaking furnish an amount effective to neutralize at least a portion of said anionic trash in said furnish of a derivatized malto-oligosaccharide prepared by a method comprising:

providing a malto-oligosaccharide;

derivatizing said malto-oligosaccharide with a cationic derivatizing agent to form a derivatized malto-oligosaccharide, said malto-oligosaccharide having a DS sufficient to render said derivatized malto-oligosaccharide suitable for use as a trash scavenger; and withdrawing a paper web from said furnish, at least a portion of the neutralized anionic trash being withdrawn in said web.

4. A paper web prepared in accordance with claim 3.

5. A process for preparing a paper web, comprising the steps of:

providing a papermaking furnish, said furnish containing fibrous material and anionic trash comprising at least one anionic trash species;

adding to said papermaking furnish an amount of a trash scavenger effective to neutralize at least a portion of said anionic trash in said furnish, said trash scavenger comprising a cationically charged malto-oligosaccharide; and withdrawing a paper web from said furnish, at least a portion of the neutralized anionic trash being withdrawn in said web.

6. A paper web prepared in accordance with claim 5.

* * * * *

UNITED STATES PATENT AND TRADEMARK OFFICE
CERTIFICATE OF CORRECTION

PATENT NO. : 6,375,798 B1  
DATED : April 23, 2002  
INVENTOR(S) : Kightlinger et al.

It is certified that error appears in the above-identified patent and that said Letters Patent is hereby corrected as shown below:

Column 1,  
Line 53, "WO095/81857" should read -- WO 95/18157 --

Column 2,  
Line 14, "any, DS" should read -- any DS --

Signed and Sealed this

Twenty-fifth Day of June, 2002

Attest:

Attesting Officer

JAMES E. ROGAN  
Director of the United States Patent and Trademark Office